US007120828B2

(12) United States Patent
Greer (10) Patent No.: US 7,120,828 B2
(45) Date of Patent: Oct. 10, 2006

(54) SYSTEM AND METHOD FOR IN-ORDER QUEUE DRAINING

(75) Inventor: Chris Greer, Allen, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 761 days.

(21) Appl. No.: 10/434,685

(22) Filed: May 9, 2003

(65) Prior Publication Data
US 2004/0236982 A1 Nov. 25, 2004

(51) Int. Cl.
*G06F 11/00* (2006.01)
(52) U.S. Cl. .................. 714/18; 714/2; 714/5; 714/10; 714/12; 714/43
(58) Field of Classification Search ............ 714/2, 714/5, 10, 18, 12, 43
See application file for complete search history.

(56) References Cited

U.S. PATENT DOCUMENTS

| 5,291,600 | A | | 3/1994 | Lutz et al. |
| 5,680,599 | A | | 10/1997 | Jaggar |
| 5,701,433 | A | | 12/1997 | Moriarty et al. |
| 5,799,305 | A | | 8/1998 | Bortvedt et al. |
| 5,987,555 | A | * | 11/1999 | Alzien et al. ............... 710/312 |
| 6,012,148 | A | | 1/2000 | Laberge et al. |
| 6,338,151 | B1 | | 1/2002 | Yudenfriend et al. |
| 6,671,704 | B1 | * | 12/2003 | Gondi et al. ................. 707/204 |
| 6,708,269 | B1 | * | 3/2004 | Tiruvallur et al. ........... 712/225 |
| 6,961,865 | B1 | * | 11/2005 | Ganesh et al. ................ 714/2 |

FOREIGN PATENT DOCUMENTS

| EP | 0 772 136 | 5/1997 |
| JP | 9-251412 | 9/1997 |

OTHER PUBLICATIONS

Richard W. Adkisson, et al., Patent Application, entitled "System and Method for Determining Transaction Time-Out," filed May 9, 2003.
Richard W. Adkisson, et al., Patent Application, entitled "Systems and Methods Controlling Transaction Draining for Error Recovery," filed May 9, 2003.
Richard W. Adkisson, et al., Patent Application, entitled "System and Method for Error Capture and Logging in Computer Systems," filed May 9, 2003.
Affidavit of Richard W. Adkisson, Feb. 17, 2005, 4 pages.
Office Action from Japanese Patent Application JP-2004-126472 dated May 16, 2006 (English Translation Provided).

* cited by examiner

*Primary Examiner*—Robert Beausoliel
*Assistant Examiner*—Joseph D Manoskey (57) ABSTRACT

Disclosed are systems and methods for determining time-outs with respect to a plurality of transactions comprising utilizing a first time-out clock for simultaneously determining time-out states with respect to a first set of transactions of the plurality of transactions, and determining when transactions of the first set of transactions have reached a timed-out state of the time-out states.

22 Claims, 5 Drawing Sheets

FIG. 4

SYSTEM AND METHOD FOR IN-ORDER QUEUE DRAINING

CROSS-REFERENCE TO RELATED APPLICATIONS

The present application is related to concurrently filed, co-pending and commonly assigned U.S. patent applications Ser. No. 10/435,127 entitled "System and Method for Transaction Time-Out," Ser. No. 10/434,920 entitled "Systems and Methods Controlling Transaction Draining for Error Recovery," and Ser. No. 10/434,925 entitled "System and Method For Error Capture and Logging in Computer Systems," the disclosures of which are hereby incorporated herein by reference.

BACKGROUND

It is not uncommon today for a computer system to be quite complex, often including multiple processors configured to provide parallel and/or distributed processing. For example, multi-processor computer systems often include not only multiple main processing units (MPUs), but may also include multiple support processors or agents, such as memory processors and the like. These various processors, as well as other system resources such as memory, input/output devices, disk devices, and the like, may be distributed throughout the computer system with communication provided by various buses. For example, a computer system may comprise a number of sub-modules, referred to herein as cells or cell cards, having a number of system resources, such as main processing units (MPUs), agents, and/or memories, and buses disposed thereon. System resources of a sub-module may make and/or service requests to and/or from other system resources. Such system resources may be associated with the same sub-module and/or other sub-modules of the system.

To service requests from multiple system resources in an orderly and predictable manner, systems may implement various protocols and transaction queues. For example, protocols may establish an order in which a plurality of transactions, e.g., requests, snoops, and responses, are to be performed and, perhaps, a number of bus cycles each such transaction is to be provided for completion. Similarly, transaction queues may store information with respect to particular transactions "in-process" with respect to a particular system resource. An in-order queue, for example, may be implemented to ensure that particular transactions are implemented in a proper order by an associated system resource. Accordingly, an in-order queue may track a number of transactions (e.g., up to 8 outstanding transactions) through their in-order phases, such as might include a request phase (e.g., requesting data), a snoop phase (e.g., querying local caches to determine if requested data is available locally), and a response phase (e.g., providing a data packet including requested data).

If an error in operation of any aspect of the system, such as with respect to any one of the aforementioned system resources, is detected by the system, an error signal may be generated to notify the appropriate system resources. Such errors may be non-critical, such as isolated to the operation of a single system resource and/or associated with a recoverable operation. However, such errors may be critical in nature, such as requiring initialization of an entire processor bus (referred to herein as a bus initialization or BINIT error) and, therefore, the system resources thereon.

A bus initialization error, or similar critical error, in a multi-processor system can lead to widespread failure, even system-wide failure, due to the interdependency of the various system resources to issue and/or respond to requests and responses. Although a single processor system may be able to recover from a bus initialization error by purging all pending transactions and fetching new instructions (e.g., "soft booting"), a multi-processor system bus initialization may result in a system "lock-up" requiring a "hard" reset or may be prevented from performing a operating system state dump useful in isolating the source of the error. For example, a bus initialization error may cause particular system resources to "hang" awaiting an anticipated transaction response when a bus upon which a system resource performing the transaction is initialized. Once the system resources on the initialized bus cease to track their associated in-order queues, they will cease to provide awaited responses to system resources not on the initialized bus. Accordingly, a bus initialization error, or similar error, can result in a cascade failure in which the entire system deadlocks.

It should be appreciated that the above described situation in which a bus initialization error results in a system lock-up requiring a hard reset is undesirable in a high availability (HA) system. Moreover, such a result does not provide for a system "crash-down" or a dump of all the memory to disk or other media to facilitate the operating system (OS) determining the cause of the error, but instead requires a system initialization which does not allow analysis of the state of the system at the time of the error.

SUMMARY

A method for draining an in-order queue, the method comprising implementing a first queue loop sequence with respect to a transaction phase of transactions stored in the in-order queue, the first queue loop sequence spoofing completion of the transaction phase for the transactions stored in the in-order queue for which the transaction phase has not been completed, and after completion of the first queue loop sequence, implementing a second queue loop sequence with respect to another transaction phase of the transactions stored in the in-order queue, the second queue loop sequence spoofing completion of the another transaction phase for the transactions stored in the in-order queue for which the another transaction phase has not been completed.

A system for draining an in-order queue, the system comprising a state machine having a first drain state and a second drain state, wherein the state machine is operable to sequence a first transaction phase pointer associated with in-process transactions using the first drain state to spoof completion of a transaction phase for the transactions, and wherein the state machine is further operable to sequence a second transaction phase pointer associated with the in-process transactions using the second drain state to spoof completion of another transaction phase for the transactions.

A computer program product having a computer readable medium having computer program logic recorded thereon for draining an in-order queue, the computer program product comprising code for implementing a first queue loop sequence with respect to a transaction phase of transactions stored in the in-order queue, the first queue loop sequence spoofing completion of the transaction phase for the transactions stored in the in-order queue for which the transaction phase has not been completed until a first transaction phase pointer reaches a predetermined value, and code for implementing a second queue loop sequence with respect to another transaction phase of the transactions stored in the in-order queue, the second queue loop sequence spoofing completion of the another transaction phase for the transactions stored in the in-order queue for which the another transaction phase has not been completed until a second transaction phase pointer reaches the predetermined value.

BRIEF DESCRIPTION OF THE DRAWINGS

FIGS. 1A, 1B-1 and 1B-2 show a portion of a multi-processor system in which an embodiment of the present invention is implemented;

DETAILED DESCRIPTION

Embodiments of the present invention provide systems and methods which recognize particular system errors, such as a critical bus initialization error, and operate to empty a queue or queues associated with system resources directly affected by the system error. According to one embodiment, a bus initialization error is detected and, while processors on the bus which is to be initialized are being held off of the bus prior to initialization, in-order queues associated with those processors are drained. Draining of queues according to embodiments of the present invention provides responses, e.g., header and/or data packets containing arbitrary data elements, to various system resources, including those not associated with the bus which is to be initialized, in accordance with queued transactions, thereby spoofing completion of transactions to various system resources.

Queue draining according to embodiments of the present invention is conducted in a hierarchical manner to ensure transaction phases indicated in an in-order queue are drained from the queue in an order consistent with operating protocols of the system. For example, all transactions associated with an earlier transaction phase will be drained from a queue before any transactions associated with a later transaction phase, according to an embodiment of the present invention. In operation according to one embodiment, in-order queues are drained to generate packets off of queued snoop transaction phases followed by generation of packets off of queued response transaction phases.

Embodiments of the invention implement a state machine with respect to transaction pointers in an in-order queue, used in normal operation to keep track of different transactions on a bus, to step through queued transactions and generate packets conforming to system protocols. The state machine may, for example, first step through each transaction in the snoop phase that has not already been through a snoop phase and issue a packet to the appropriate system resource. Thereafter, the state machine may step through each transaction that has not gone through a response phase and issue the appropriate packets. Operation of such a state machine according to embodiments of the invention keeps counters internal to the system in sync. Moreover, operation of such a state machine may be utilized to keep queues from wedging, thereby preventing system resources from timing out or otherwise failing to continue processing.

It should be appreciated that draining queues according to embodiments of the present invention is particularly useful with respect to providing graceful termination and/or recovery of a system and, particularly, in facilitating diagnosis of a cause of critical system errors. For example, embodiments of the invention facilitate an operating system (OS) dumping memory states, such as to a disk, useful for analysis of the source of a bus initialization error.

Figure 1A:
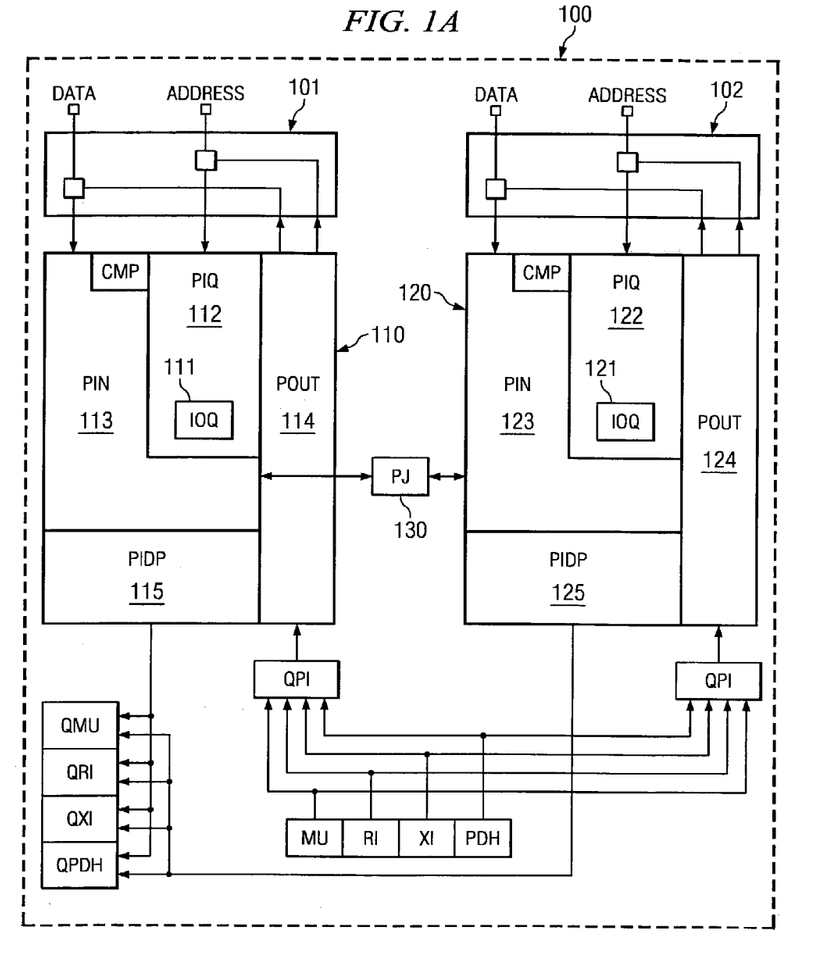

Directing attention to FIG. 1A a portion of a computer system in which an embodiment of the present invention is implemented is shown as sub-module, or cell controller, 100. The host system of which sub-module 100 is a part may comprise a multi-processor system, such as a Hewlett Packard rx or sx series server system implementing a plurality of Intel ITANIUM processors.

The illustrated embodiment of sub-module 100 includes a plurality of buses, here shown as buses 101 and 102, such as may be utilized in providing communication between various system resources, such as main processing units (MPUs), memory processors, memory, and/or the like (all not shown). Sub-module 100 further includes a plurality of processor interfaces, here processor interfaces 110 and 120, such as may arbitrate data communication between an associated processor or processors (e.g., memory processors) and an associated bus (e.g., a corresponding one of buses 101 and 102). Such communications may be utilized in providing communication between the aforementioned associated processors and various other system resources, such as MPUs, memory processors, memory, etcetera, of the host system, whether disposed upon sub-module 100 or disposed elsewhere in the host system (e.g., one or more other sub-modules corresponding to sub-module 100).

Processor interfaces 110 and 120 of the illustrated embodiment comprise a processor input block (PIN), here processor interface blocks 113 and 123 respectively, a processor output block (POUT), here processor output blocks 114 and 124 respectively, and a processor interface data path (PIDP), here processor interface data paths 115 and 125. The illustrated embodiment of processor interfaces 110 and 120 further comprises processor interface in-order queues (PIQs) 112 and 122, respectively, providing tracking of various transactions to thereby implement system protocols and/or otherwise provide controlled and predictable arbitration of the aforementioned communications. Processor interface in-order queues 112 and 122 of the illustrated embodiment include in-order queues (IOQs) 111 and 121, respectively. In-order queues 111 and 121 of the illustrated embodiment track transaction phases to ensure completion of transactions in-order according to an overriding protocol.

Figure 1B:
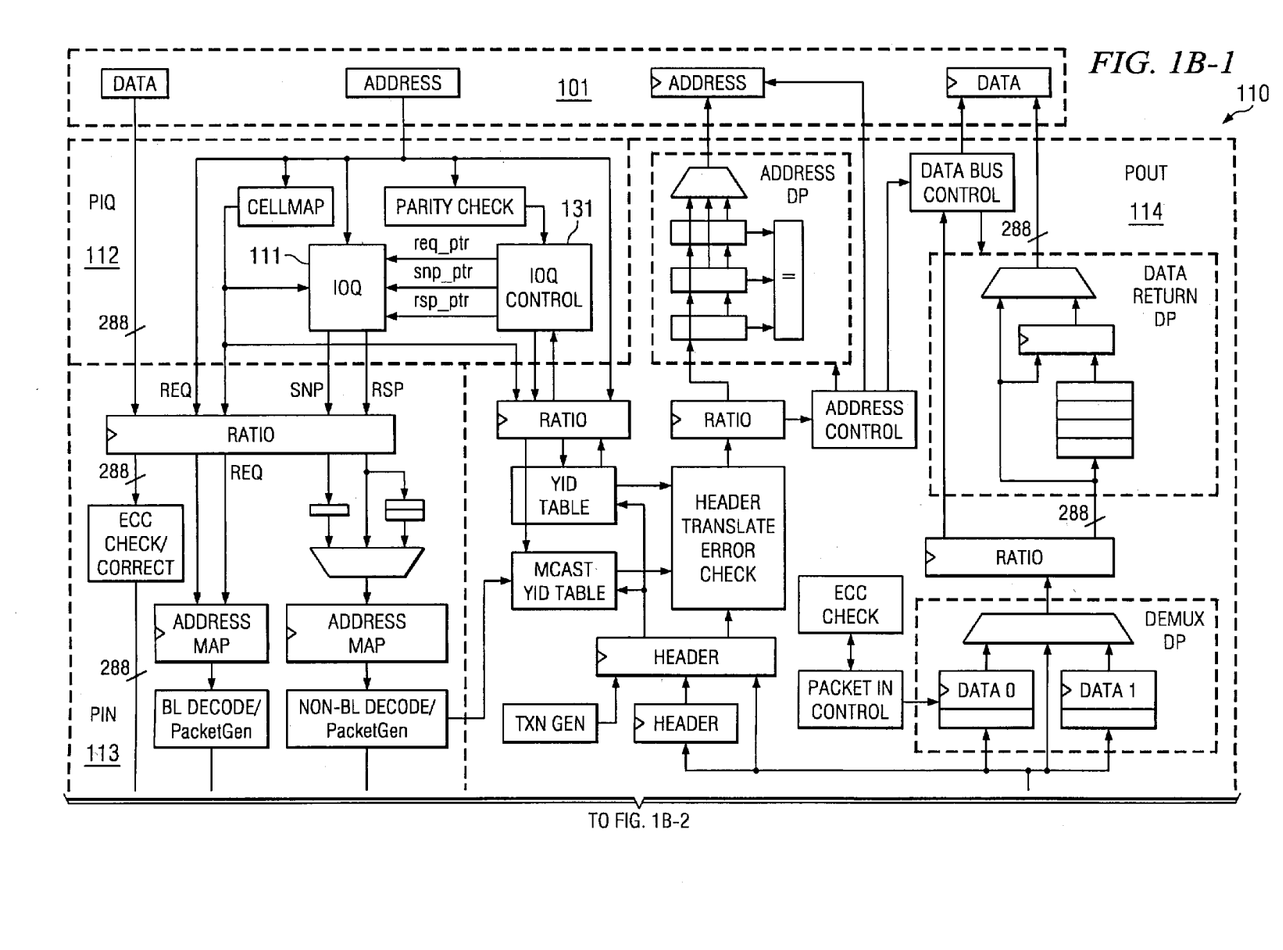
Figure 1B:
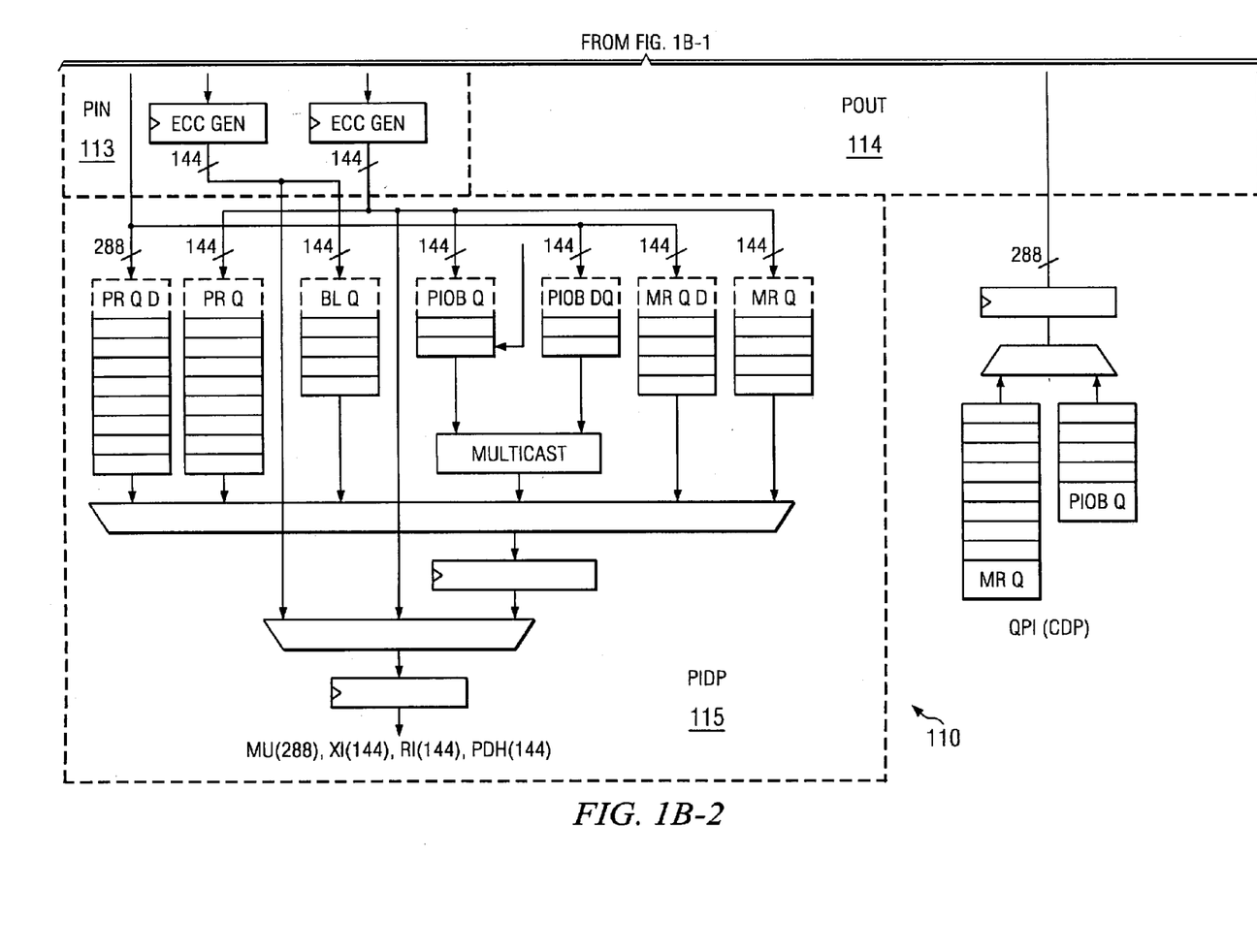

FIGS. 1B-1 and 1B-2 show further detail with respect to an embodiment of a processor interface of sub-module 100 of FIG. 1A. As can be seen in the embodiment of FIGS. 1B-1 and 1B-2, processor interface 112 includes in-order queue control module 131 providing control signals request pointer (req_ptr), snoop pointer (snp_ptr), and response pointer (rsp_ptr) operable to control phases (request phase, snoop phase, and response phase) of the transactions queued in in-order queue 111.

Figure 2:
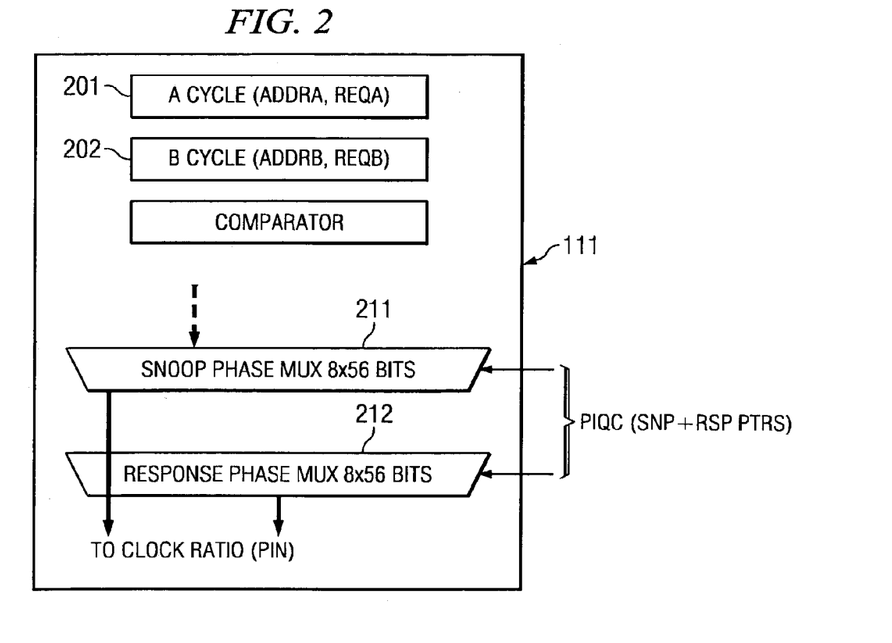
FIG. 2 shows detail with respect to an in-order queue operable according to embodiments of the present invention.

Directing attention to FIG. 2, a portion of the entries of in-order queue 111, e.g., a slice of an eight entry in-order queue, are shown according to one embodiment. Specifically, in-order queue 111 of the illustrated embodiment includes entries 201 and 202, such as may correspond to transactions in various phases of completion by an associated processor. In normal operation, in-order queue 111 interfaces with processor input block 113 and processor output block 114 to generate system packets out of the snoop phases and the response phases, thus having a capability of generating multiple packets at the same time into the system.

In-order queue 111 of FIG. 2 includes multiplexers 211 and 212 operable under control of the aforementioned control signals to propagate transactions through appropriate phases and, ultimately, out of in-order queue 111. For example, multiplexer 211 may be associated with an early transaction phase, here a "snoop phase," and multiplexer 212 may be associated with a late transaction phase, here a "response phase." Although multiplexers 211 and 212 may be operated independently, and preferably simultaneously, to generate packets attendant to the queued transactions, a particular transaction should complete a snoop phase prior to its processing in a response phase, thus establishing an in-order queue protocol.

In normal operation the aforementioned pointers will keep track of the different phases the transactions of in-order queue 111 are in. These pointers will move up and down in the queue as the appropriate packets are generated and associated with the phases of the transactions. However, when a critical error is detected, such as a bus initialization (BINIT) error, one or more of the system resources may go into reset. For example, if a bus initialization error is issued with respect to bus 101, a processor associated with processor interface 110 may go into reset, thereby dumping any current data and fetching code to restart operations. Accordingly, any transactions queued in in-order queue 111 become meaningless with respect to the operation of the associated processor. According to conventional logic, in-order queue 111 would also be initialized. However, embodiments of the present invention operate to drain an in-order queue after a critical error, to thereby spoof packets and thus prevent other system resources from locking-up or otherwise failing to continue processing after the critical error.

Figure 3:
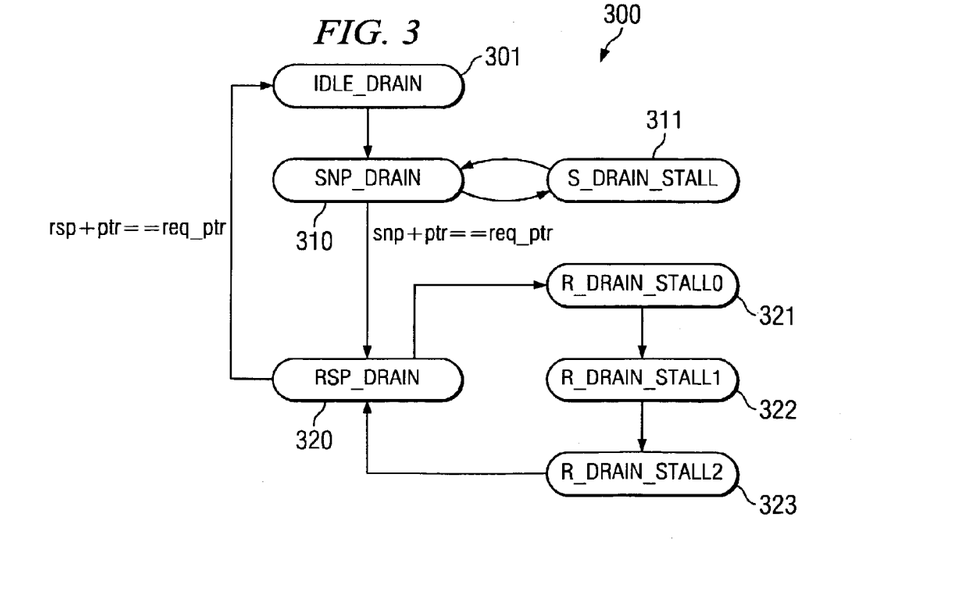
FIG. 3 shows a state machine for implementing in-order queue draining according to embodiments of the present invention.

Directing attention to FIG. 3, state machine 300, such as may be implemented within in-order queue control module 131, providing in-order queue draining according to an embodiment of the present invention is shown. As is known in the art, in general a state machine is any device that stores the status of something at a given time and can operate on input to change the status and/or cause an action or output to take place for any given change.

During normal system operation, state machine 300 is held in idle drain state 301. However, when a bus initialization error is detected state machine 300 transfers from idle drain state 301 to a first state operable to provide queue draining according to the teachings of the present invention (here snoop drain state 310). In operation according to embodiments of the present invention, processors and/or other system resources of the bus for which a bus initialization error is detected are prevented from initializing during draining of the in-order queue. For example, system resources on the bus for which a bus initialization error is detected may be prevented from making new requests during all states of state machine 300 except idle drain state 301. Further detail with respect to holding system resources off of a particular bus during completion of particular operations is provided in the above referenced patent application entitled "Systems and Methods Controlling Transaction Draining for Error Recovery".

Snoop drain state 310 is associated with an early transaction phase of the system transaction protocol; in this example a "snoop phase". Accordingly, state machine 300 will cause a next queued transaction pending in the earlier transaction phase "snoop" to be selected and a properly formatted packet or packets, although perhaps including arbitrary data elements, generated at snoop drain state 310. The generated snoop phase packet will propagate through the system as in normal operation, thereby spoofing completion of the snoop phase with respect to that transaction.

Embodiments of the invention operate to provide in-order queue draining in accordance with system protocols. For example, system protocols may establish that snoop packets are to be generated no more frequently than every other cycle, such as to allow downstream logic insulated from the queue draining, e.g., processor input block 113, to operate as normal. Accordingly, state machine 300 of the illustrated embodiment includes snoop drain stall state 311, entered after snoop drain state 310, to facilitate in-queue draining according to system protocols.

According to the illustrated embodiment, state machine 300 sequences back and forth between snoop drain state 310 and snoop drain stall state 311 until the early transaction phases are sufficiently drained. For example, snoop drain state 310 and snoop drain stall state 311 may be alternated between, thus generating snoop phase packets every other cycle, until the snoop pointer equals the request pointer. It should be appreciated that, once the snoop transaction phase pointer equals the request pointer (the initial transaction phase pointer), every transaction in the in-order queue will have been taken through a spoofed snoop phase. Accordingly, once the snoop pointer equals the request pointer, the illustrated embodiment of state machine 300 transfers to a state (here response drain state 320) operable to provide queue draining of transaction phases associated with a later transaction phase of the system transaction protocol; in this example a "response phase."

Response drain state 320 is associated with a transaction phase of the system transaction protocol subsequent to that of snoop drain state 310. Accordingly, although operation to drain an in-order queue according to embodiments of the present invention may not operate to spoof particular transaction phases in an order in which they might be processed during normal operation, embodiments of the present invention ensure that the phases associated with each transaction are spoofed in their proper order. In the illustrated embodiment, since all snoop phase transactions will be spoofed prior to spoofing any response phase transactions, it should be appreciated that the phases associated with each transaction are spoofed in the desired order.

In operation according to the illustrated embodiment, state machine 300 will cause a next-queued transaction to receive a "response" phase to be selected and a properly formatted packet or packets, although perhaps including arbitrary data elements, generated at response drain state 320. As with the aforementioned snoop phase packets, the generated response phase packet will propagate through the system as in normal operation, thereby spoofing completion of the response phase with respect to that transaction.

As discussed above, embodiments of the invention operate to provide in-order queue draining in accordance with system protocols. Accordingly, state machine 300 of the illustrated embodiment includes response drain stall states 321–323, entered after response drain state 320, to facilitate in-order queue draining according to system protocols.

According to the illustrated embodiment, state machine 300 sequences between response drain state 320, response drain stall state 321, response drain stall state 322, and response drain stall state 323 until the later transaction phases are sufficiently drained. For example, in the illustrated embodiment response drain stall states are provided such that a response packet will be spoofed every fourth clock cycle, until the response pointer equals the request pointer. It should be appreciated that, once the response transaction phase pointer equals the request pointer (the initial transaction phase pointer), every transaction in the in-order queue will have been taken through a spoofed response phase. Once the response pointer equals the request pointer, state machine 300 of the present invention may transfer to a subsequent desired state, such as a state operable to provide queue draining of transaction phases associated with a still later transaction phase of the system transaction protocol. However, in the illustrated embodiment, only two transaction phases are present to be drained and, therefore, state machine 300 of the illustrated embodiment returns to idle drain state 301, such as to allow processors on the bus for which an initialization error was detected to be released from reset and allowed to initialize.

Figure 4:
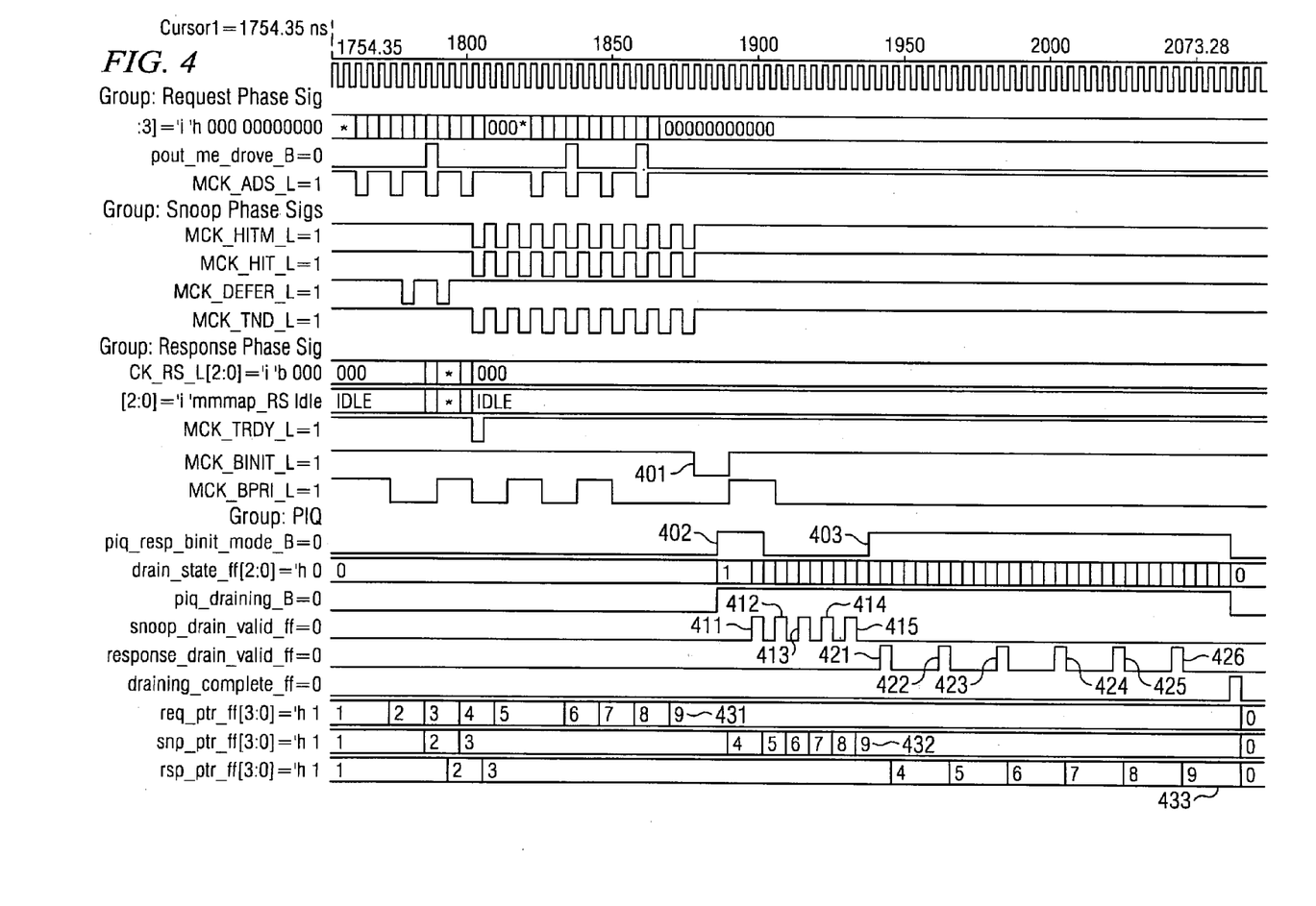
FIG. 4 shows a timing diagram corresponding to operation of the state machine of FIG. 3.

Directing attention to FIG. 4, a timing diagram showing operation according to state machine 300 is shown. At 401, a bus initialization error is present in the system. Accordingly, shortly after 401, the bus initialization state signal group in the processor interface queue group transfers from the idle state to a drain state at 402. 411–415 represent a sequence of drain states with respect to a first transaction phase, e.g., the aforementioned snoop phase. As can be seen at 431 and 432, after sequencing through 411–415, a second transaction phase pointer, here the snoop pointer, equals a first transaction phase pointer, here the request pointer. Accordingly, at 403 the bus initialization state signal group transfers to a second drain state. 421–426 represent a sequence of drain states with respect to a second transaction phase, e.g., the aforementioned response phase. As can be seen at 431 and 433, after sequencing through 421–426, a third transaction phase pointer, here the response pointer, equals a first transaction phase pointer, here the request pointer.

It should be appreciated that implementation of the aforementioned drain states and drain stall states as shown in the illustrated embodiment is exemplary of states which may be employed according to the present invention. Whether to employ particular states and the number of particular states to employ may vary upon attributes of the system and/or protocols used therewith. For example, the illustrated embodiment employs two drain states, associated with the two transaction phases for which a failure to complete the transaction phase may result in queue wedges and/or system resources locking-up. Embodiments of the present invention may implement any number of such drain states, as appropriate.

Similarly, the illustrated embodiment employs three response drain stall states with respect to a particular drain state to accommodate cases on the bus where a transaction is in a response phase and data is driving without a processor, e.g., on a cache line. The four cycles implemented with respect to the response phase packet spoofing ensure that such data properly propagates through the system, such as processor input block 113 and/or processor interface data path block 115 of the illustrated embodiment, according to system protocols irrespective of the actual status of the transaction when the critical error was detected. Embodiments of the present invention may implement any number of such drain stall states (including zero) and in any combination with respect to the particular drain states, as appropriate.

It should be appreciated that queue draining according to embodiments of the invention is adapted to accommodate a variety of packets. For example, normal system operation may not only employ packets directed to particular system resources, but may also employ multi-point packets, such as multi-cast packets. A processor bus in one of the cells of a system may, for example, issue a cache sync packet which is to be sent to a plurality of system resources, such as all memory processors in a protection domain (i.e., all cells operable under control of a particular operating system). Each processor bus of a protection domain would need to see a cache sync packet in order to do a cache sync. Accordingly, in normal operation a processor interface may receive such a multi-cast packet request from an associated processor and send it to all the cells that are in that protection domain, expecting an acknowledgement for each request packet sent. However, as discussed above, a cell might comprise multiple processors and/or multiple buses. Accordingly, although the multi-cast packet cache sync is ultimately acted upon by a plurality of system resources within a single cell, the requesting system resource may expect only a single acknowledgement from each cell.

Processor junction (PJ) block 130 of the illustrated embodiment provides coordination of such multi-cast acknowledgements in normal operation. Specifically, processor junction block 130 recognizes that a particular packet is a multi-cast packet and will consult with each processor input block 113 and 123 to allow only the last to complete the transaction to actually send the expected acknowledgement. According to the illustrated embodiment, there are counters in processor junction block 130 to deal with these situations. Operation of in-order queue draining according to embodiments of the present invention, spoofing each queued transaction phase in-order, will keep the aforementioned processor junction block 130 counters in sync, thereby keeping the system stable even with respect to various types of pending transactions.

It should be appreciated that, although the drain states of the illustrated embodiment of the present invention operate to generate packets conforming to system protocols, because the system resources on the bus for which a bus initialization error has been detected are held in reset, the generated packets are likely to include invalid data elements. For example, particular data packets may contain null data, such as all zeros. Accordingly, although avoiding situations in which queues are wedged or system resources are locked-up awaiting a transaction to be completed by system resources associated with a bus having had a critical error, operation according to embodiments of the present invention may result in one or more errors being experienced by system resources throughout the system as a result of the spoofed transaction phases. However, it is expected that these operational errors will be of a lesser magnitude, e.g., non-critical, and therefore system processing may continue through an orderly crash, core dump, and/or soft initialization. Accordingly, embodiments of the present invention preferably implement error capturing and/or logging, such as shown in the above referenced patent application entitled "System and Method for Error Capture and Logging in Computer Systems".

It should be appreciated that operation of queue draining according to the present invention may be implemented in combination with additional critical fault recovery techniques. For example, in-order queue draining according to embodiments of the present invention may be implemented in a system fault recovery process which also includes out of order buffer draining, such as shown in the above referenced patent application entitled "Systems and Methods Controlling Transaction Draining for Error Recovery". According to one embodiment, in-order queue draining may be implemented and completed, followed by out of order buffer draining, which is then followed by a return to normal system operations. Accordingly, in-order queue draining according to embodiments of the present invention may assert signals, such as a "piq-draining" signal, to system resources or other functional blocks, such as processor output block 114, during in-order queue draining to coordinate operation with respect thereto.

Although embodiments have been described above with reference to system resources of a protection domain, it should be appreciated that advantages of embodiments of the present invention are not limited to multi-processor environments wherein system resources are exclusively partitioned between protection domains. For example, in-order queue draining according to embodiments of the present invention may be particularly useful with respect to systems implementing globally shared memory (GSM), wherein system resources are utilized across partitions of protection domains. By implementing in-order queue draining according to embodiments of the invention, one protection domain crashing will not bring down another protection domain, even where those protection domains share memory, as queue wedges and/or system resource lock-ups will be avoided allowing one protection domain to gracefully crash and the remaining protection domains to continue processing.

When implemented in software, the elements of the present invention are essentially the code segments to perform tasks as described herein. The program or code segments can be stored in a computer readable medium or transmitted by a computer data signal embodied in a carrier wave, or a signal modulated by a carrier, over a transmission medium. The computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

What is claimed is:

1. A method for draining an in-order queue, said method comprising:
   implementing a first queue loop sequence with respect to a transaction phase of transactions stored in said in-order queue, said first queue loop sequence spoofing completion of said transaction phase for said transactions stored in said in-order queue for which said transaction phase has not been completed; and
   after completion of said first queue loop sequence, implementing a second queue loop sequence with respect to another transaction phase of said transactions stored in said in-order queue, said second queue loop sequence spoofing completion of said another transaction phase for said transactions stored in said in-order queue for which said another transaction phase has not been completed.

2. The method of claim 1, wherein said first recited transaction phase comprises a snoop phase.

3. The method of claim 1, wherein said another transaction phase comprises a response phase.

4. The method of claim 1, wherein at least one of said first queue loop sequence and said second queue loop sequence comprise:
   implementing a stall state to conform said spoofing to a particular protocol.

5. The method of claim 4, wherein said implementing a stall state comprises implementing a plurality of stall states.

6. The method of claim 1, wherein operation of said first queue loop continues until a transaction phase pointer associated with said first recited transaction phase reaches a predetermined value, and operation of said second queue loop continues until a transaction phase pointer associated with said another transaction phase reaches said predetermined value.

7. The method of claim 6, wherein said predetermined value corresponds to a transaction phase pointer associated with a transaction phase other than said first recited transaction phase and said another transaction phase.

8. The method of claim 1, further comprising:
   detecting a critical error, wherein said implementing said first queue loop and said second queue loop sequence are responsive to detecting said critical error.

9. The method of claim 8, wherein said critical error comprises a bus initialization error.

10. The method of claim 8, further comprising:
    holding particular system resources off of a bus associated with said critical error during implementing said first queue loop sequence and said second queue loop sequence.

11. The method of claim 1, further comprising:
    controlling said implementing said first queue loop sequence and said implementing said second queue loop sequence to facilitate a memory dump of a multi-processor system.

12. The system of claim 1, further comprising:
    controlling said implementing said first queue loop sequence and said implementing said second queue loop sequence to facilitate an orderly crash with respect to a first protection domain of a multi-processor system without crashing a second protection domain of said multi-processor system.

13. A system for draining an in-order queue, said system comprising:
    a state machine having a first drain state and a second drain state, wherein said state machine is operable to sequence a first transaction phase pointer associated with in-process transactions using said first drain state to spoof completion of a transaction phase for said transactions, and wherein said state machine is further operable to sequence a second transaction phase pointer associated with said in-process transactions using said second drain state to spoof completion of another transaction phase for said transactions.

14. The system of claim 13, wherein sequencing said first transaction phase pointer by said state machine is continued until said first transaction phase pointer equals a third transaction phase pointer, and wherein sequencing said second transaction phase pointer by said state machine is continued until said second transaction phase pointer equals said third transaction phase pointer.

15. The method of claim 14, wherein said first recited transaction phase comprises a snoop phase, said another transaction phase comprises a response phase, and a transaction phase associated with said third transaction phase pointer comprises a request phase.

16. The system of claim 13, further comprising:
    an in-order queue controller, wherein said state machine is disposed within said in-order queue controller.

17. The system of claim 16, further comprising:
    an in-order queue in communication with said in-order queue controller, wherein said in-order queue stores said in-process transactions.

18. The system of claim 13, wherein said state machine further has at least one stall state associated with one of said first drain state and said second drain state, said stall state being implemented to ensure compliance with a system protocol when spoofing completion of a corresponding one of said first recited transaction phase and said another transaction phase.

19. The system of claim 13, wherein said state machine is operable in cooperation with detection of a critical error.

20. The system of claim 13, wherein said state machine is disposed in a multi-processor system and said draining said in-order queue is controlled to facilitate a memory dump of said multi-processor system.

21. The system of claim 13, wherein said state machine is disposed in a multi-processor system having a plurality of protection domains, said protection domains sharing globally shared memory, wherein said draining said in-order queue is controlled to facilitate an orderly crash with respect to a first protection domain of said protection domains without crashing a second protection domain of said protection domains.

22. A computer program product having a computer readable medium having computer program logic recorded thereon for draining an in-order queue, said computer program product comprising:

code for implementing a first queue loop sequence with respect to a transaction phase of transactions stored in said in-order queue, said first queue loop sequence spoofing completion of said transaction phase for said transactions stored in said in-order queue for which said transaction phase has not been completed until a first transaction phase pointer reaches a predetermined value; and code for implementing a second queue loop sequence with respect to another transaction phase of said transactions stored in said in-order queue, said second queue loop sequence spoofing completion of said another transaction phase for said transactions stored in said in-order queue for which said another transaction phase has not been completed until a second transaction phase pointer reaches said predetermined value.

* * * * *

UNITED STATES PATENT AND TRADEMARK OFFICE
CERTIFICATE OF CORRECTION

PATENT NO. : 7,120,828 B2  Page 1 of 1
APPLICATION NO. : 10/434685
DATED : October 10, 2006
INVENTOR(S) : Chris Greer It is certified that error appears in the above-identified patent and that said Letters Patent is hereby corrected as shown below:

On the Title page, item (57), under "Abstract", in column 2, lines 1-7,
delete "Disclosed are systems and methods for determining time-outs with respect to a plurality of transactions comprising utilizing a first time-out clock for simultaneously determining time-out states with respect to a first set of transactions of the plurality of transactions, and determining when transactions of the first set of transactions have reached a timed-out state of the time-out states." and insert -- Disclosed are systems and methods for draining an in-order queue comprising implementing a first queue loop sequence with respect to a transaction phase of transactions stored in the in-order queue, the first queue loop sequence spoofing completion of the transaction phase for the transactions stored in the in-order queue for which the transaction phase has not been completed, and after completion of the first queue loop sequence, implementing a second queue loop sequence with respect to another transaction phase of the transactions stored in the in-order queue, the second queue loop sequence spoofing completion of the another transaction phase for the transactions stored in the in-order queue for which the another transaction phase has not been completed. --, therefor.

Signed and Sealed this

Twenty-fourth Day of August, 2010

David J. Kappos
*Director of the United States Patent and Trademark Office*